(12) United States Patent
Zebchuk et al.

(10) Patent No.: US 11,573,800 B2
(45) Date of Patent: Feb. 7, 2023

(54) COMPLEX I/O VALUE PREDICTION FOR MULTIPLE VALUES WITH PHYSICAL OR VIRTUAL ADDRESSES

(71) Applicant: MARVELL ASIA PTE, LTD., Singapore (SG)

(72) Inventors: Jason D. Zebchuk, Watertown, MA (US); Wilson P. Snyder, II, Holliston, MA (US); Michael S. Bertone, Marlborough, MA (US)

(73) Assignee: MARVELL ASIA PTE, LTD., Singapore (SG)

( * ) Notice: Subject to any disclaimer, the term of this patent is extended or adjusted under 35 U.S.C. 154(b) by 650 days.

(21) Appl. No.: 16/209,739

(22) Filed: Dec. 4, 2018

(65) Prior Publication Data
US 2020/0012499 A1 Jan. 9, 2020

Related U.S. Application Data

(60) Provisional application No. 62/694,414, filed on Jul. 5, 2018.

(51) Int. Cl.
*G06F 9/38* (2018.01)
*G06F 9/30* (2018.01)
*G06F 9/50* (2006.01)
*G06F 12/10* (2016.01)
*G06F 9/48* (2006.01)

(52) U.S. Cl.
CPC ........ *G06F 9/3832* (2013.01); *G06F 9/30043* (2013.01); *G06F 9/4881* (2013.01); *G06F 9/5077* (2013.01); *G06F 12/10* (2013.01); *G06F 2212/65* (2013.01)

(58) Field of Classification Search
None
See application file for complete search history.

(56) References Cited

U.S. PATENT DOCUMENTS

| | | | | |
|---|---|---|---|---|
| 5,659,798 A | * | 8/1997 | Blumrich | G06F 13/28 710/22 |
| 7,636,835 B1 | * | 12/2009 | Ramey | G06F 9/30003 712/10 |
| 7,895,431 B2 | | 2/2011 | Bouchard et al. | |
| 8,200,877 B2 | * | 6/2012 | Brune | G06F 13/4031 710/305 |
| 8,595,465 B1 | * | 11/2013 | Raz | G06F 12/1027 711/208 |

(Continued)

FOREIGN PATENT DOCUMENTS

WO 2006/031459 A1 3/2006

*Primary Examiner* — Qing Yuan Wu
(74) *Attorney, Agent, or Firm* — Hamilton, Brook, Smith & Reynolds, P.C.

(57) ABSTRACT

An apparatus, and corresponding method, for input/output (I/O) value determination, generates an I/O instruction for an I/O device, the I/O device including a state machine with state transition logic. The apparatus comprises a controller that includes a simplified state machine with a reduced version of the state transition logic of the state machine of the I/O device. The controller is configured to improve instruction execution performance of a processor core by employing the simplified state machine to predict at least one state value of at least one I/O device true state value to be affected by the I/O instruction at the I/O device.

23 Claims, 8 Drawing Sheets

(56) References Cited

U.S. PATENT DOCUMENTS

| | | | |
|---|---|---|---|
| 9,753,859 B2 | 9/2017 | Snyder, II et al. | |
| 2005/0089016 A1* | 4/2005 | Zhang | H04L 43/0858 370/351 |
| 2006/0248280 A1* | 11/2006 | Al-Sukhni | G06F 9/30047 711/137 |
| 2010/0005205 A1* | 1/2010 | Brune | G06F 13/4031 710/105 |
| 2010/0082948 A1* | 4/2010 | Matsuda | G06F 3/0237 712/207 |
| 2012/0317360 A1* | 12/2012 | Zettler | G06F 12/0888 711/122 |
| 2013/0170274 A1* | 7/2013 | Yu | G11C 11/4063 365/230.01 |
| 2014/0040512 A1* | 2/2014 | Fernald | G06F 13/28 710/22 |
| 2015/0193690 A1* | 7/2015 | Dreps | G06F 1/3206 706/46 |
| 2016/0134471 A1* | 5/2016 | Basso | H04L 69/22 709/226 |
| 2016/0275030 A1* | 9/2016 | Wakuda | G06F 13/4022 |
| 2018/0024941 A1* | 1/2018 | Pape | G06F 12/0811 711/122 |
| 2018/0181403 A1* | 6/2018 | Vorbach | G06F 9/30123 |
| 2018/0336031 A1* | 11/2018 | DeHon | G06F 12/1458 |
| 2020/0004536 A1* | 1/2020 | Shevgoor | G06F 9/3832 |

\* cited by examiner

COMPLEX I/O VALUE PREDICTION FOR MULTIPLE VALUES WITH PHYSICAL OR VIRTUAL ADDRESSES

RELATED APPLICATION

This application claims the benefit of U.S. Provisional Application No. 62/694,414 filed on Jul. 5, 2018. The entire teachings of the above application are incorporated herein by reference.

BACKGROUND

In computer systems, a processor may comprise one or more independent units of electronic circuitry, referred to as cores or processor cores, that may perform basic arithmetic, logical, control, and input/output (I/O) operations by carrying out instructions of a computer program. To access data from an I/O device, the processor uses I/O instructions, such as load, store, request, etc.

A processor core may generate an I/O instruction as a part of its normal instruction issue and a load/store pipeline under the control of a controller. Such an I/O instruction may be an "x86" I/O style instruction or a memory mapped I/O style instruction, that is, a memory instruction with an address that points to the I/O device. A load I/O instruction may comprise a structure that includes a physical or virtual address from which to load data. A store I/O instruction may comprise a structure that includes data and a physical address or virtual address to which to store the data. The I/O device decodes the I/O instruction and carries out an action, e.g., to store data, or to return data to the processor core. The decoding process may take into account the provided physical address and may also depend on the store data. In the case of a load I/O instruction, the action includes returning a data value to the processor core.

SUMMARY

According to an example embodiment, an apparatus for input/output (I/O) value determination may comprise a processor core configured to generate an I/O instruction for an I/O device. The I/O device may include a state machine with state transition logic. The apparatus may comprise a controller including a simplified state machine with a reduced version of the state transition logic of the state machine of the I/O device. The controller may be configured to improve instruction execution performance of the processor core by employing the simplified state machine to predict at least one state value of at least one I/O device true state value to be affected by the I/O instruction at the I/O device.

The I/O request may be a load request, store request, or an atomic request. An atomic request is a type of I/O read+write instruction. For example, an atomic request may send data to the I/O device and receive read data in return. A typical implementation of an atomic request is an atomic add-and-read, that is, write a number to add and read the result.

The I/O instruction may include a physical address or virtual address, the at least one state value may include multiple state values, and the at least one I/O device true state value may include multiple I/O device true state values.

The multiple state values may be inter-dependent.

The I/O device may include a scheduler and the at least one state value predicted by the simplified state machine may represent at least one prediction of a subset of an I/O device state of an entity to which the scheduler assigns work.

The processor core may include a load/store pipeline and a multiplexer and, in an event the I/O instruction is a state-read or atomic request including a physical address: the multiplexer may be configured to omit forwarding the state-read or atomic request to the I/O device; and the controller may be configured to determine which one or more of the at least one state value predicted via the simplified state machine should be read in accordance with the state-read or atomic request's physical address and return the one or more of the at least one predicted state values determined to the load/store pipeline. The one or more of the at least one predicted state values determined may include multiple values.

In an event the I/O instruction includes a virtual address, the processor core may be configured to translate the virtual address to a physical address and the controller is configured to: search a table for a matching entry for which the I/O instruction's virtual address matches a predicted virtual address and other fields stored in the matching entry, the other fields specific to address translation in an architecture. In an event the matching entry is found, the controller may be further configured to determine whether the physical address is associated with the I/O device based on the matching entry and, in an event it is determined that the physical address is not associated with the I/O device, the controller may be further configured to mark the matching entry as invalid.

In an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, can be predicted and there is at least one predicted change, the controller may be further configured to update a prediction of: the at least one state value, the at least one future state value, or a combination thereof.

In an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, cannot be predicted, the controller may be further configured to mark a prediction indicator invalid.

In an event (i) the matching entry is found, (ii) it is determined that the physical address is associated with the I/O device, (iii) the I/O instruction is a store request, read request, or atomic request, and (iv) the simplified state machine determines that a change can be predicted but no change is to be made to the at least one state value predicted or to the at least one future state value, the controller may be configured to perform no action.

In an event that the matching entry is not found, the controller may be further configured to determine whether the physical address is associated with the I/O device. In an event that it is determined that the physical address is associated with the I/O device, the controller may be further configured to: set the at least one state value to at least one respective predetermined value; configure a prediction valid indicator to indicate that the at least one state value predicted is valid; and store the virtual address in a predicted virtual address table.

According to another example embodiment, a method for input/output (I/O) value determination at a processor core may comprise generating an I/O instruction for an I/O device, the I/O device including a state machine with state transition logic; and improving instruction execution performance of the processor core by employing a simplified state machine with a reduced version of the state transition logic of the state machine of the I/O device to predict at least one state value of at least one I/O device true state value to be affected by the I/O instruction at the I/O device.

The processor core may include a load/store pipeline and, in an event the I/O instruction is a state-read or atomic request including a physical address, the method may further comprise: omitting forwarding the state-read or atomic request to the I/O device; and determining which one or more of the at least one state value predicted via the simplified state machine should be read in accordance with state-read or atomic request's the physical address and returning the one or more of the at least one predicted state values determined to the load/store pipeline. The one or more of the at least one predicted state values determined includes multiple values.

In an event the I/O instruction includes a virtual address, the method may further comprise: translating the virtual address to a physical address; searching a table for a matching entry for which the I/O instruction's virtual address matches a predicted virtual address and other fields stored in the matching entry, the other fields specific to address translation in an architecture. In an event the matching entry is found, the method may further comprise determining whether the physical address is associated with the I/O device based on the matching entry. In an event it is determined that the physical address is not associated with the I/O device, the method may further comprise marking the matching entry as invalid.

In an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, can be predicted and there is at least one predicted change, the method may further comprise updating a prediction of: the at least one state value, the at least one future state value, or a combination thereof.

In an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, cannot be predicted, the method may further comprise marking a prediction indicator invalid.

In an event (i) the matching entry is found, (ii) it is determined that the physical address is associated with the I/O device, (iii) the I/O instruction is a store request, read request, or atomic request, and (iv) the simplified state machine determines that a change can be predicted but no change is to be made to the at least one state value predicted or to the at least one future state value, the method may further comprise perform no action.

In an event that the matching entry is not found, the method may further comprise determining whether the physical address is associated with the I/O device and, in an event that it is determined that the physical address is associated with the I/O device, the method may further comprise: setting the at least one state value to at least one respective predetermined value; configuring a prediction valid indicator to indicate that the at least one state value predicted is valid; and storing the virtual address in a predicted virtual address table.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Processors interact with I/O devices using load, store, and atomic instructions. These accesses cannot be optimized using normal cache techniques due to side-effects. As a result, load, store, and atomic requests sent to I/O devices are subject to long latencies while the load, store, or atomic request is sent to the I/O device, and, in the case of a load or atomic request, the I/O device returns the data. An example embodiment disclosed herein reduces such latency and thus, improves overall performance of a processor.

Almost all computers, load store architecture or not, load data from a larger memory into registers where it is used for arithmetic, manipulated, or tested, by machine instructions. All computers interact with I/O devices, and regardless of whether they use memory-mapped I/O or special instructions, they still perform loads/stores to I/O devices.

Figure 1:
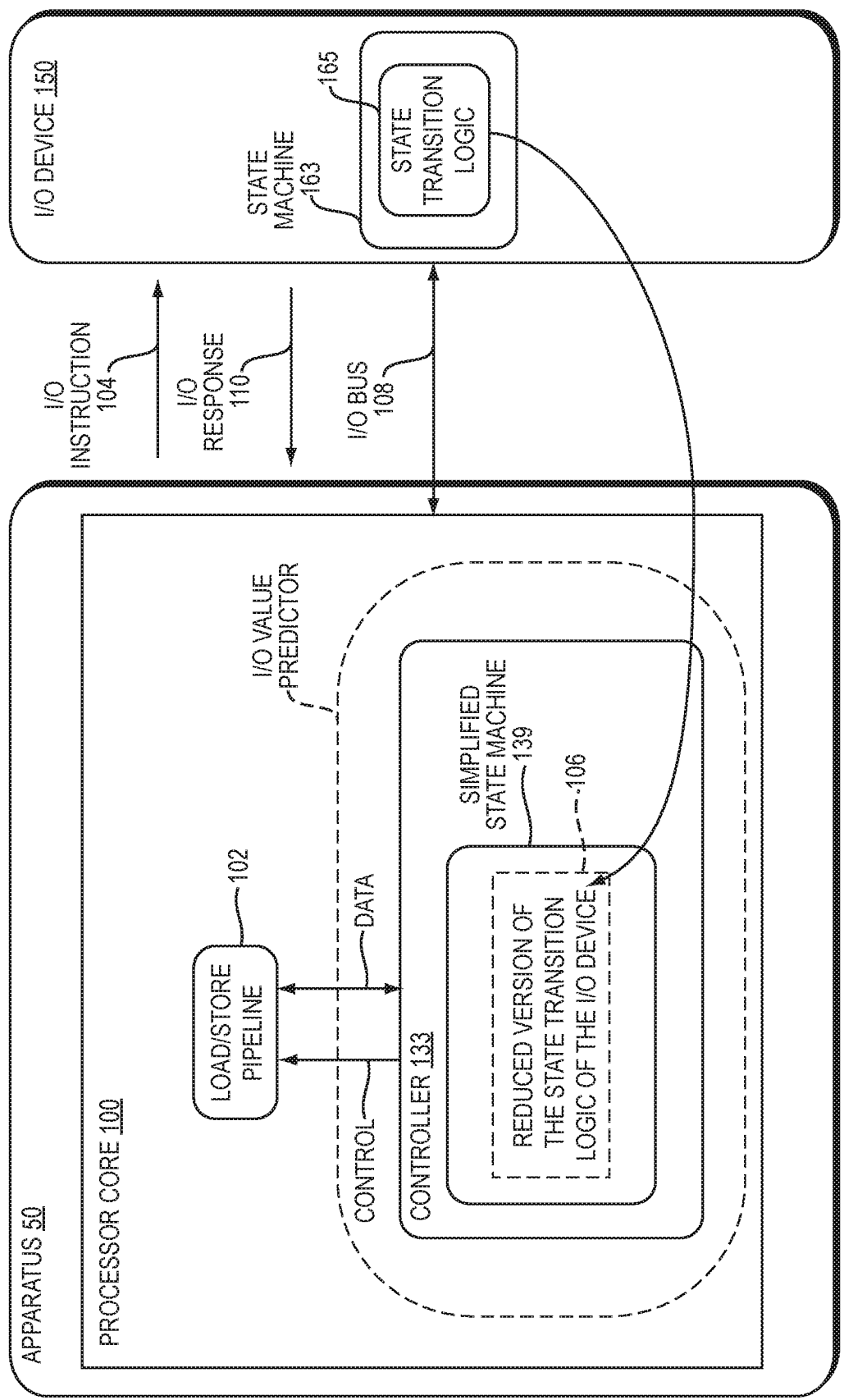
FIG. 1 is a block diagram of an example embodiment of an apparatus for input/output (I/O) value determination.

FIG. 1 is a block diagram of an example embodiment of an apparatus 50 for input/output (I/O) value determination. According to an example embodiment, the apparatus 50 is a processor. The apparatus 50 comprises a processor core 100 configured to generate an I/O instruction 104 for an I/O device 150. The I/O instruction may include an address (not shown) that may be a physical address or a virtual address. The I/O instruction may be any suitable type of I/O instruction including a memory mapped I/O load/store/atomic instruction.

The I/O device 150 may be any suitable I/O device that includes a state machine with state transition logic. An I/O device is any device communicatively connected to a central processing unit (CPU) and/or a main memory to enable transfer of information in response to an I/O instruction. Such a device may include, for example, a disc drive, modem, Universal Serial Bus (USB) device, network packet scheduler, and/or other devices known to a person of ordinary skill in the art.

The I/O device 150 includes a state machine 163 with state transition logic 165. The apparatus 50 further comprises a controller 133 that includes a simplified state machine 139 with a reduced version 106 of the state transition logic 165 of the state machine 163 of the I/O device 150. The controller 133 may be configured to improve instruction execution performance of the processor core 100 by employing the simplified state machine 139 to predict at least one state value (not shown) of at least one I/O device true (i.e., actual) state value to be affected by the I/O instruction 104 at the I/O device 150. A "predicted" value may be referred to interchangeably herein as a "presumed" value. Such a "predicted" value may be understood to be a state value that was, is, or will be the actual true state value, but may not be the actual true state value at the current instant in time. A "future" state value may be referred to as a predicted value (i.e., a predicted state value) that a state value will hold following an expected subsequent (i.e., future) event. The expected subsequent event may be, e.g., an I/O instruction, or completion of an event within the I/O device 150. In the latter case, the I/O device 150 may communicate the occurrence of the event via a change value 243 and corresponding change entry 244, disclosed further below with regard to FIG. 2, where the change value 243 indicates that the predicted state value should be updated to the future state value.

The I/O instruction 104 may be communicated to the I/O device 150 via an I/O bus 108 bus that may be any suitable type of I/O bus, such as a USB bus, Peripheral Components Interconnect (PCI) local bus, PCI Express (PCIe) bus, or any other suitable type of I/O bus. According to an example embodiment, the processor core 100 and the I/O device 150 may be communicatively coupled. It should be understood that the term "communicatively coupled" is intended to specify a communication path permitting information exchange either directly among the communicatively coupled entities, or via an intervening entity.

In response to receiving the I/O instruction 104, the I/O device may perform an action based on a type of the I/O instruction 104, such as load, store, or atomic request type of I/O instruction, or any other suitable type of I/O instruction, based on an address of the I/O instruction, and/or based on data of the I/O instruction, and the I/O device 150 may communicate an I/O response 110 as a result of completing the action. The I/O response 110 may be any suitable response and may include the at least one state value. According to an example embodiment, the controller 133 may employ the simplified state machine 139 to predict the at least one state value to be affected by the I/O instruction 104 at the I/O device 150 such that instruction execution of the processor core 100 may advance instead of stalling execution until the at least one state value is received from the I/O device 150 via the I/O bus 108. The controller 133 with the simplified state machine 139 may be referred to interchangeably herein as an I/O value predictor.

For example, the processor core 100 may generate the I/O instruction 104, such as a load/store instruction or any other suitable instruction, as part of its normal instruction issue and a load/store pipeline 102. The load/store instruction may create a physical address which is forwarded to the I/O device 150 via the I/O instruction 104. The I/O device 150 may decode the I/O instruction 104 and, based on the decoding, the I/O device 150 may carry out an action, such as store data to or to load data from the provided physical address. Alternatively, the load/store instruction may create a virtual address that may be translated to a physical address, as disclosed further below with regard to FIG. 2.

By means of an example, the action may comprise ringing a doorbell to notify the I/O device 150 that there is an action to be carried out by the I/O device 150, e.g., a Direct Memory Access (DMA). It should be understood that the action comprising ringing the doorbell and subsequent actions pertaining to same are for illustrative purposes and that an example embodiment disclosed herein is not limited to same.

An initiation of the action, that is, ringing the doorbell, may set a value of a BUSY bit in a register (not shown) of the I/O device 150 to true. The I/O device 150 may complete the action either based on internal activity or on receiving another I/O instruction. Such another I/O instruction may comprise, e.g., a load/store I/O instruction to abort the pending I/O instruction. The action completion results in the I/O device 150 in carrying out a final action, which causes the register value to change. Thus, continuing with the example disclosed above, the final action may comprise the DMA operation being completed and the completion of the action may set the value of the BUSY bit in the register to false. At any time during the above-disclosed sequence of events, the processor core 100 may issue another I/O instruction, e.g., a request I/O instruction, to determine the value in the register.

For example, the processor core 100 may issue the I/O instruction 104 as a request I/O instruction with a data structure that includes a physical address from which to read data. As such, the processor core 100 may generate a request I/O instruction as part of its normal instruction issue and the load/store pipeline 102, and forward the request I/O instruction to the I/O device 150. The request I/O instruction may be decoded by the I/O device 150 and the I/O device may carry out the action of reading the value in the register and returning the value in the register as part of the I/O response 110 that may be returned to the processor core 100 via the load/store pipeline 102 by means of the I/O bus 108. This request and response is subject to latency while the request I/O instruction is sent to the I/O device 150 and the I/O device 160 returns the data.

Having to read state, such as the value of the register disclosed above, via a long latency path is undesirable and may limit the overall system performance. According to the example embodiment, the apparatus 50 further comprises a controller 133 that includes a simplified state machine 139 with a reduced version 106 of the state transition logic 165 of the state machine 163 of the I/O device 150. The controller 133 may be configured to improve instruction execution performance of the processor core 100 by employing the simplified state machine 139, disclosed further below with regard to FIG. 3, to predict at least one state value of at least one I/O device true state value, such as a predicted value of a true state of the register disclosed above, or any other at least one state value, to be affected by the I/O instruction 104 at the I/O device 150, as disclosed below with regard to FIG. 2.

Figure 2:
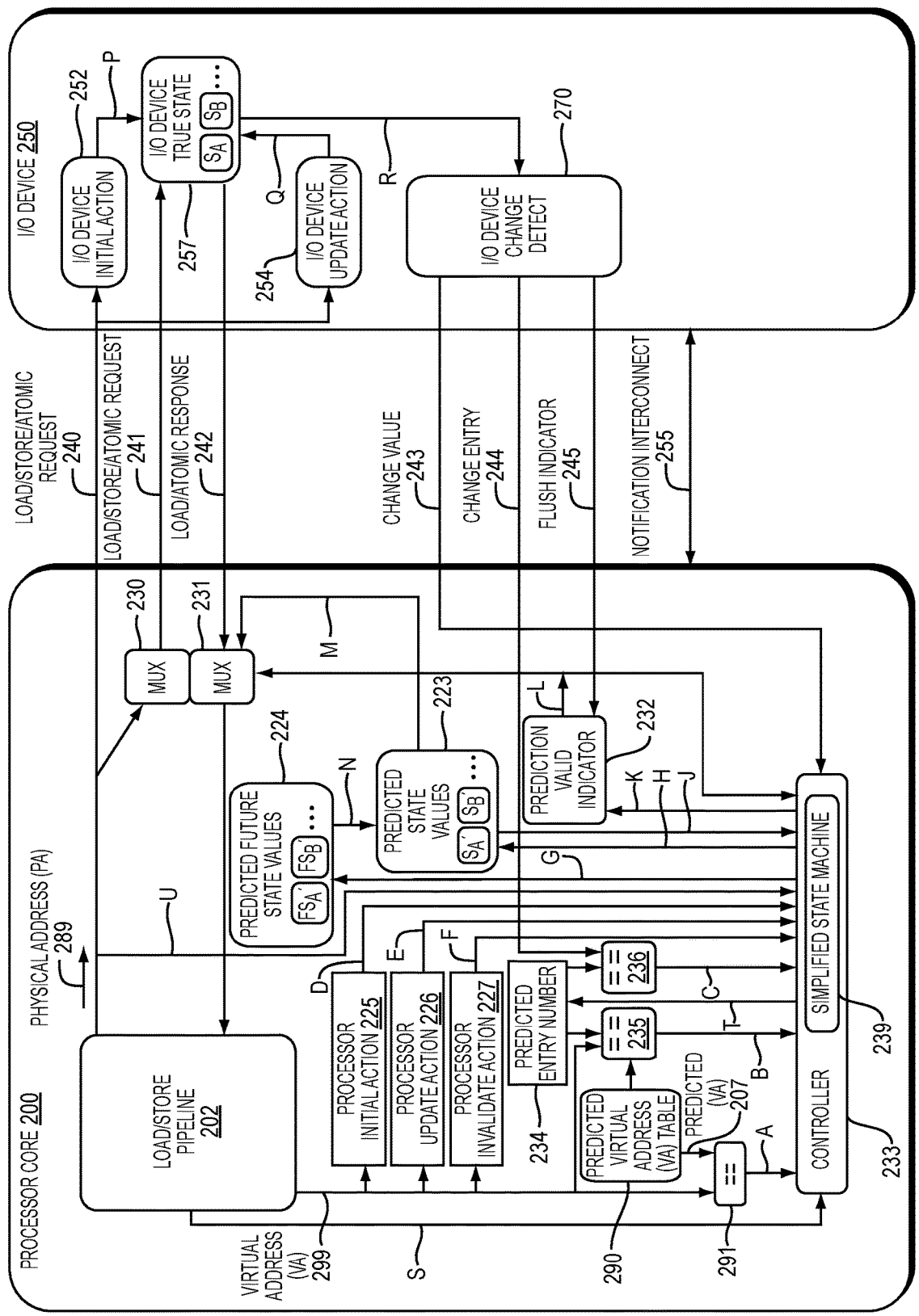
FIG. 2 is a block diagram of an example embodiment of a processor core of the apparatus of FIG. 1.

FIG. 2 is a block diagram of an example embodiment of a processor core 200 of the apparatus 50 of FIG. 1, disclosed above. The processor core 200 includes a load/store pipeline 202 and a controller 233 that includes a simplified state machine 239 with a reduced version of state transition logic of a state machine of an I/O device 250, such as the reduced version 106 of the state transition logic 165 of the state machine 163, disclosed above. The controller 233 may be configured to improve instruction execution performance of the processor core 200 by employing the simplified state machine 239 to predict at least one state value of at least one I/O device true state value to be affected by an I/O instruction, such as the one or more predicted state values 223 (i.e., $S'_A$, $S''_B$, etc.) or the one or more predicted future state values 224 (i.e., $FS'_A$, $FS'_B$, etc.) that are predictions of the one or more I/O device true state values 257 (i.e., $S_A$, $S_B$, etc.) that are to be affected by the I/O instruction, such as the load/store/atomic request 240 or the load/atomic request 241, at the I/O device 250. The simplified state machine 239 may be configured to generate G, that is, new value(s) for the one or more predicted future state values 224 and H, that is, new value(s) for the one or more predicted state values 223, also referred to herein as the one or more current predicted state values. The simplified state machine 239 may be configured to receive J, that is, current values of the one or more predicted state values 223 (i.e., $S'_A$, $S''_B$, etc.) that may be updated with N, that is, the future predicted state values (i.e., $FS'_A$, $FS'_B$, . . . etc.).

As disclosed above with regard to FIG. 1, the I/O instruction 104 may include an address that may be a physical address or a virtual address. For example, the load/store pipeline 202 may generate a load/store instruction, or any other suitable instruction, and a virtual address (VA) 299 or a physical address (PA) 289. If the VA 299 is generated, the processor core 200 may translate the VA 299 to the PA 289 and initiate an action transaction with the I/O device 250, for example, via the load/store/atomic request 240, causing the I/O device 250 to perform an I/O device initial action 252 that may set P, that is, initial values of the one or more I/O device true state variables 257 (i.e., $S_A$, $S_B$, etc.).

The action transaction may complete via an I/O device update action 254 that modifies the I/O device's one or more I/O device true state values 257 (i.e., $S_A$, $S_B$, etc.) with Q, that is, updated value(s) of one or more true state variables. In some cases, a load or atomic I/O instruction may cause an initial or update action which may then return a response, such as a load/atomic response 242. In other cases, a store or atomic request I/O instruction may cause an update action to modify one or more of the I/O device true state values 257 (i.e., $S_A$, $S_B$, etc.) and the I/O device 250 may not return any response and a subsequent I/O instruction, such as the load/atomic request 241, may cause the load/atomic response 242 to be returned.

When the processor core 200 generates a load/store/atomic instruction, such as the load/store/atomic request 240, and the VA 299, the VA 299 is compared at a comparator 291 to a predicted VA 207 of a predicted VA table 290. It should be understood that the predicted VA 207 may not be simply an address. Rather, the predicted VA 207 may include one or more fields that may be employed to identify a unique virtual address. For example, the predicted VA table 290 may be configured to store predicted VA entries that may include fields present in a standard translation lookaside buffer (TLB) (not shown) of a processor (not shown) that may store virtual to physical address mappings for many different recently accessed regions in memory.

The comparator 291 may be configured to compare fields of entries of the predicted VA table 290 that may include fields similar to a standard TLB entry used by the processor architecture as known to the art. The comparator 291 may be configured to generate A, where A may be an indication of whether the virtual address matches a predicted virtual address range associated with an I/O device, such as the I/O device 250. According to an example embodiment, A may be a simple Boolean, that is, a true or false value.

As disclosed in e.g., U.S. Pat. No. 9,753,859 B2, incorporated herein by reference, unlike a database of physical addresses, which can be pre-determined because a physical address belongs to an I/O device, a virtual address does not belong to an I/O device but is a subject to mapping and, as such, a database of virtual addresses is built-on-the-fly. As such, the virtual addresses stored in the predicted VA table 290 may be referred to as "predicted" virtual addresses. Each of the predicted virtual addresses may have been generated the first time the I/O device has been accessed via a physical address in response to an I/O instruction that includes a virtual address.

Internal to the load/store pipeline 202, the processor core may determine both the VA 299 and the PA 289. The load value predictor compares the VA 299 against a set of predicted VAs, and may take actions when a match occurs. If the VA 299 does not match any predicted VAs, then it will later receive the PA 289. If the VA 299 matches an initial action and the PA 289 matches a physical address of an appropriate I/O device, then the controller 233 may update the predicted VA table 290 with the VA 299 that corresponds to the PA 289.

In an event that the VA 299 matches a VA in the predicted VA table 290, and an action is determined by the controller 233, such action may not occur until the processor core provides the PA 289 and confirms that the PA 289 is correct, that is, that the PA 289 maps to the I/O device and that any address bits that select a specific entry match the predicted entry B.

For the comparator 291 to indicate a match of the VA 299, the predicted VA 207 that matches the VA 299 needs to be valid as indicated by the prediction valid indicator 232, a value of which may set by K, that is, a new valid bit that may be generated by the simplified state machine 239. Additionally, a VA page must be the same as the prediction as compared by 291, i.e., the various fields must match as required by the processor architecture as known to the art. If the predicted VA 207 matches, this VA corresponds to a PA that the I/O value predictor, that is, the controller 233, is handling. The comparison/mux 230 determines whether the I/O instruction is a state-read or atomic request or a store or atomic request that modifies the value. A value L of the prediction valid indicator 232 may be forwarded to both the mux 231 and the simplified state machine 239.

In an event there is a match between the VA 299 and the predicted VA 207 and L is true, that is, the entry has been marked valid, on a state-read or atomic request, the mux 230 does not send a status read request to the I/O device 250, instead the controller 233 reads the one or more predicted state values 223 and returns M, that is, current predicted state values $S'_A$, $S'_B$, . . . , etc., via the mux 231 to the load/store pipeline 202. As the one or more predicted state values 223 are local, the status read has completed with reduced latency. On a store or atomic request that modifies the value, the controller 233 updates the one or more predicted state values 223 and then forwards the store or atomic request to the I/O device via the mux 230. The I/O device 250 handles the request as disclosed above.

If the VA does not match, the processor proceeds with normal address translation as it would with any load/store. When the physical address 289 is generated, the request is forwarded to the I/O device 250 via the load/store/atomic request 240 and the I/O device 250 handles the request as disclosed above. In such case, U, that is, the actual physical address (PA) 289 for a load/store or atomic request from the processor core 200, may be forwarded to the simplified state machine 239.

The controller 233 may compare the PA 289 against the address(es) of the I/O device 250. In general, a portion of the address bits may be common between a virtual address and a physical address it may map to. For example, when using a 4 KB page, a bottom portion that includes 12 bits of a physical address and a virtual address will be common. Thus, the controller 233 may identify an initial action 252 by comparing the bottom bits of the VA 299 against a bottom portion of the physical address the I/O device 250 will use for the initial action 252.

In an event the PA 289 matches the I/O device address 250 and the VA 299 matches an initial action, the controller 233 may allocate an entry, setting a predicted VA equal to the VA 299, indicating which entry in the I/O device in the predicted entry number 234, setting the state values in 223 to respective predetermined initial states, setting the future state in 224 to a predetermined initial state, and marking the prediction valid in 232.

In an embodiment, the physical address bits of the PA 289 may determine which I/O device to cache. In such cases, the selected device is recorded in the predicted entry number 234. In addition, the controller 233 stores the virtual address into the predicted virtual address entry of the predicted VA table 290.

Updating an entry in the predicted VA table 290 may include storing standard TLB entry fields that may have been determined from a state of the processor core 200 and from the virtual memory page tables, as is standard in the art. This also sets the prediction valid indicator 232 to be true, that is, to reflect valid.

The predicted virtual address entry should be invalidated based on rules specific to that architecture as known to the art, such as in a manner that a standard TLB entry may be invalidated. According to an example embodiment, this may be done overly-aggressively, that is, any predicted virtual address entry invalidate may clear the prediction valid indicator 232 to indicate false, that is, invalid. In this manner, a second transaction to the same VA will hit, that is match, as disclosed above, skipping translation and resulting in reduced latency.

When the I/O instruction has completed, a change in the one or more I/O device true state values 257 causes an I/O device change detector 270 to notice a change in R, that is, a change in current values of the I/O device true state values, and notify the processor core 200 of a new value via the change value 243 sent via a notification interconnect 255, also indicating which of a possible plurality of devices is updating via the change entry 244. If the processor 200 is tracking a particular I/O device, as indicated by the comparator 236 that checks whether the predicted entry number 234 is equal to the change entry 244, the controller 233 updates the one or more predicted state values 223. The change detection may occur after the I/O instruction completes, after a future I/O instruction, after an I/O instruction from a different processor in a multiprocessor system is issued, or after some other I/O event occurs.

A comparator 235 may be employed to provide an indication C to the controller 233 as to whether a predicted physical address matches the predicted entry number 234 of the current predictor state. The entry number may be identified by a subset of address bits of the physical address bits. According to an example embodiment, the indication C may be simple Boolean (i.e., true/false value).

The I/O device 250 may have cases where the one or more true state values 257 become indeterministic, or otherwise when the I/O device state does not match the prediction state, such as may happen, for example, when the I/O device 250 is reset. When this occurs, the I/O device 250 may indicate a flush via the flush indicator 245 which invalidates the prediction by clearing the prediction valid indicator 232.

As disclosed in FIG. 2, the I/O device 250 may store multiple state fields, that is, the one or more I/O device true state values 257. Additionally, the I/O device 250 includes a state machine, such as the state machine 163 of FIG. 1, disclosed above. Such a state machine may be a complex state machine that controls how the one or more I/O device true state values 257 change, depending on a sequence of actions performed by the I/O device 250.

For example, a load or store transaction may immediately change a value of multiple state values of the one or more I/O device true state values 257. Such state values may be referred to interchangeably herein as fields. A load or store transaction may initiate a sequence of events within the I/O device 250 that may update the value of one or more state fields, that is, the one or more I/O device true state values 257, at an indeterministic time in the future. Further, an external event, such as a reset of the I/O device 250 or any other suitable internal or external event, may cause the I/O device 250 to update a value(s) of the state fields, that is, the one or more I/O device true state values 257.

As such, an example embodiment includes the simplified state machine 239, that is a reduced version of state transition logic of the state machine employed by the I/O device 250, that enables the controller 233, also referred to interchangeably herein as a load value predictor or predicator, and enables the controller 233 to predict value(s) of the one or more I/O device true state values 257 that may be multiple inter-dependent state fields. According to an example embodiment, the controller 233 may use the simplified state machine 239 to predict and store the one or more predicted state values 223 that may be respective predictions of the true values of the multiple inter-dependent state fields.

For example, the load/store pipeline 202 may generate, e.g., a load/store instruction, and the VA 299. In an event the load/store pipeline 202 generates the load/store instruction and the VA 299 virtual address, the VA 299 is compared by the comparator 291 to a predicted VA entry from the predicted VA table 290. The predicted VA entry may include most of the fields of a standard TLB, as disclosed above. For the predicted VA to match, the predicted VA must be marked valid, and the fields must match, where matching may be determined based on virtual address translation rules specific to that architecture as known to the art. If the predicted VA matches, the predicted VA is mapped to a predicted PA that the controller 233 is handling. The controller 233 compares the predicted PA to a set of known physical addresses that may be stored in a database (not shown) and may determine an appropriate action as disclosed below.

According to an example embodiment, in an event a state-read or atomic request is issued from the load/store pipeline 202, the mux 230 does not send the state-read or atomic request to the I/O device 250. Rather, the controller 233 determines which one or more predicted state values the specific PA should read, reads them from the one or more predicted state values 223 and returns those predicted values via the mux 231 to the load/store pipeline 202. As the one or more predicted state values 223 are local to the processor core 200, the state-read or atomic has completed with reduced latency relative to receiving one or more of the I/O device true state values 257 from the I/O device 250. It should be understood that a single state-read or atomic request might return multiple state values, for example, a 64-bit read might contain multiple smaller values (e.g., 1-bit, 2-bit, etc., or a single read that may return multiple 64-bit data elements).

According to an example embodiment, in an event the load/store pipeline 202 issues a store or atomic request, the mux 230 forwards the store or atomic request to the I/O device 250 and the I/O device 250 handles the request as disclosed above. In addition, in parallel with the I/O device 250 handling the store or atomic request, the controller 233 proceeds to handle the store or atomic request using the simplified state machine 239 that mimics the behavior of the I/O device 250 using a reduced version of the state transition logic of the state machine of the I/O device 250.

Depending on the specific address the store or atomic request is targeted at, the controller 233 may be configured to operate as follows. In an event the simplified state machine 239 indicates that it can predict the I/O device 250 behavior, for example, as dictated by portion of the state transition logic of the reduced version, the controller 233 may update the one or more predicted state values 223 and/or update one or more predicted future state values 224. In an event the simplified state machine 239 identifies and indicates that it cannot predict the I/O device 250 behavior, that is, action in response to the store or atomic request, the controller 233 may mark the prediction invalid by clearing the prediction valid indicator 232. Further, in an event the simplified state machine 239 identifies that the store or atomic request will not change any of the one or more predicted state values 223, the controller 233 may perform no action.

According to an example embodiment, the processor core 200 may include processor update action logic 226. The processor update action logic 226 may be configured to generate E, that is, an indication that a portion of the virtual address 299 indicates this request is for an "update action." E may be multiple valued to differentiate between multiple possible update actions, e.g., (<no match>, <update action 1>, <update action 2>, . . . , etc.).

According to an example embodiment, the processor core 200 may include processor invalidate action logic 227. The processor invalidate action logic 227 may be configured to generate F, that is, an indication that a portion of the virtual address 299 indicates this request is for an "invalidate action." According to an example embodiment, F may have a Boolean true/false value.

In an event the VA 299 does not match, the processor core may proceed with normal address translation as it would with any load/store. As such, when the PA 289 is generated, the load, store, or atomic request may be forwarded, that is, the load/store/atomic request 240 may be sent to the I/O device which may handle it as disclosed above.

In addition, according to an example embodiment, in an event the VA 299 does not match, in response to generation of the physical address, initial action logic 225 inside the processor 225 compares the physical address 289 against a set of one or more physical addresses that the I/O device 250 uses to configure, with known values determined by the I/O device 250, the one or more true state values 257 with respective values predicted by the controller 233 and stored as the one or more predicated state values 223. The initial action logic 225 may generate D, that is, an indication that a portion of the virtual address 299 indicates this request is for an "initial action." The "initial action" may happen where there is no matching predicted VA, i.e., for a case of no VA match but PA match. D may be a simple Boolean true/false or may be an indicator configured to differentiate between multiple possible initial actions.

As disclosed above, an initial action can occur when the VA does not match, where matching may be determined based on virtual address translation rules specific to that architecture as is known in the art. Similarly, an initial action can also occur when the VA does match. According to an example embodiment, if the signal D indicates an initial action has been detected, the processor core 200 records values of the one or more predicted state values from the controller 233 into the one or more predicted state values 223, and sets the prediction valid indicator 232. In addition, according to an example embodiment, the processor core 200 may use physical address bits to determine which I/O device to cache, in which case an identifier of the I/O device may be recorded in the predicted entry number 234. Further, the controller 233 may be configured to store the virtual address into a predicted VA entry of the predicted VA table 290.

According to an example embodiment, to update the predicted VA entry, the controller 233 may be configured to store standard TLB fields from a state of the processor core 200 is currently executing in and from data provided from virtual memory page tables, as is standard in the art. Such action may also set the prediction valid indicator 232 to indicate valid. The predicted VA entry needs to be invalidated based on rules specific to that architecture as known to the art, as disclosed above. According to an example embodiment, this may be done overly-aggressively; that is, any standard TLB invalidate may clear the prediction valid indicator 232.

According to an example embodiment, the one or more predicted state values 223 may be based on any one or more of: store data S, that is, store data that is stored when the VA 299 is the VA for a store or atomic request, address bits from a load or store or atomic request; or predicting that some state values will become architecturally unpredictable as a result of the transaction, in which case, the one or more predicted state values may be configured to contain an arbitrary value, that is, a respective predetermined value.

As disclosed above, when the I/O instruction has completed, a change in the one or more I/O device true state values 257 causes an I/O device change detector 270 to notice a change in R, that is, a change in current values of the I/O device true state values. According to an example embodiment, in an event the I/O device change detector 270 detects a change in one or more of the I/O device true state values 257, the I/O device change detector may take one of three possible actions. According to a first possible action, the I/O device change detector 270 may notify the processor core 200 of the new value(s) via the change value 243 sent via the notification interconnect 255, also indicating which of a possible plurality of I/O devices is updating the one or more I/O device true state values 257 via entry the change entry 244. If the processor core 200 is tracking this I/O device as indicated by the predicted entry number 234 being equal to the change entry 244 as determined by the comparator 236, controller 233 may be configured to update the one or more predicted state values 223 in accordance with the simplified state machine 239. The comparator 236 may generate C, that is, an indication as to whether the entry number from the I/O device change detector 270 matches the entry number of the current predictor state. According to an example embodiment, C may be a Boolean true/false value. The updated predicted state values may be explicitly communicated as a value via the change value 243 sent via the notification interconnect 255, or one or more predicted future state values 224 stored on a previous load/store transaction, or value(s) calculated by the simplified state machine 239.

According to a second possible action, the I/O device change detector 270 may notify the processor core 200 via the flush 245 that it should flush the change entry 244. If the processor core 200 is tracking this I/O device as indicated by the predicted entry number 234 being equal to the change entry 244, the controller 233 may mark a prediction H as invalid by clearing the prediction valid indicator 232 via the new valid indictor K. This may happen because the I/O device 250 has identified that the simplified state machine 239 cannot handle the state transitions needed to predict a set of new state values for the one or more I/O device true state values 257; and/or the change value 243 sent via the notification interconnect 255 is not capable of or does not have sufficient bandwidth for communicating the changed state values, that is, the change value 243. For example, if the predicted state contains 3 state values and the notification interconnect 255 can only communicate a change in 2 state variables, then a single event that simultaneously changes all three state values may invalidate the prediction.

According to a third possible action, the I/O device change detector 270 may identify that the simplified state machine 239 has already updated the one or more predicted state values 223 and thus, takes no additional action.

While an example embodiment disclosed above discloses tracking of one predicted VA with one associated set of state values, an example embodiment extends such tracking to track multiple predicted virtual addresses (VAs), each with an associated set of state values.

It is possible for the load/store pipeline 202 to generate a store or atomic request at a same time that the I/O device 250 indicates the change value 243 via the notification interconnect 255. According to an example embodiment, to simplify the overall design, the controller 233 may be configured to handle these two events occurring at the same time because the implementation may not allow for stalling the load/store pipeline 202 or applying backpressure to the notification interconnect 255.

According to an example embodiment, if the change value 243 received from the I/O device 250 does not modify any state values modified by the processor core 200, then both changes may occur in parallel.

According to an example embodiment, if the simplified state machine 239 identifies that a store or atomic request will result in invalidating a predicted state entry targeted by the change value 243 received via the notification interconnect 255 from the I/O device 250, then the change value 243 that was received via the notification interconnect 255 may be discarded.

According to an example embodiment, if the simplified state machine 239 identifies that the store or atomic request and change value notification may make conflicting changes to a same state value, or if the simplified state machine 239 cannot identify deterministic values for all state values, then the controller 239 may invalidate the predicted state entry if servicing the two requests in different orders would result in different final state values, that is, different state predictions.

As disclosed above, an example embodiment may include configuring the controller 233 to be overly aggressive in invalidating predicted values in rare conditions such as races, errors, and scenarios that are deemed not performance critical. This further simplifies the simplified state machine 239 and reduces an area (i.e., real estate), power and complexity of the notification interconnect 255.

The process described above may be simplified to use physical addresses instead of virtual addresses. In such a scenario, the predicted state may be identified solely by the predicted entry number 234, and all concerns with predicted VA data and invalidation are removed.

Figure 3:
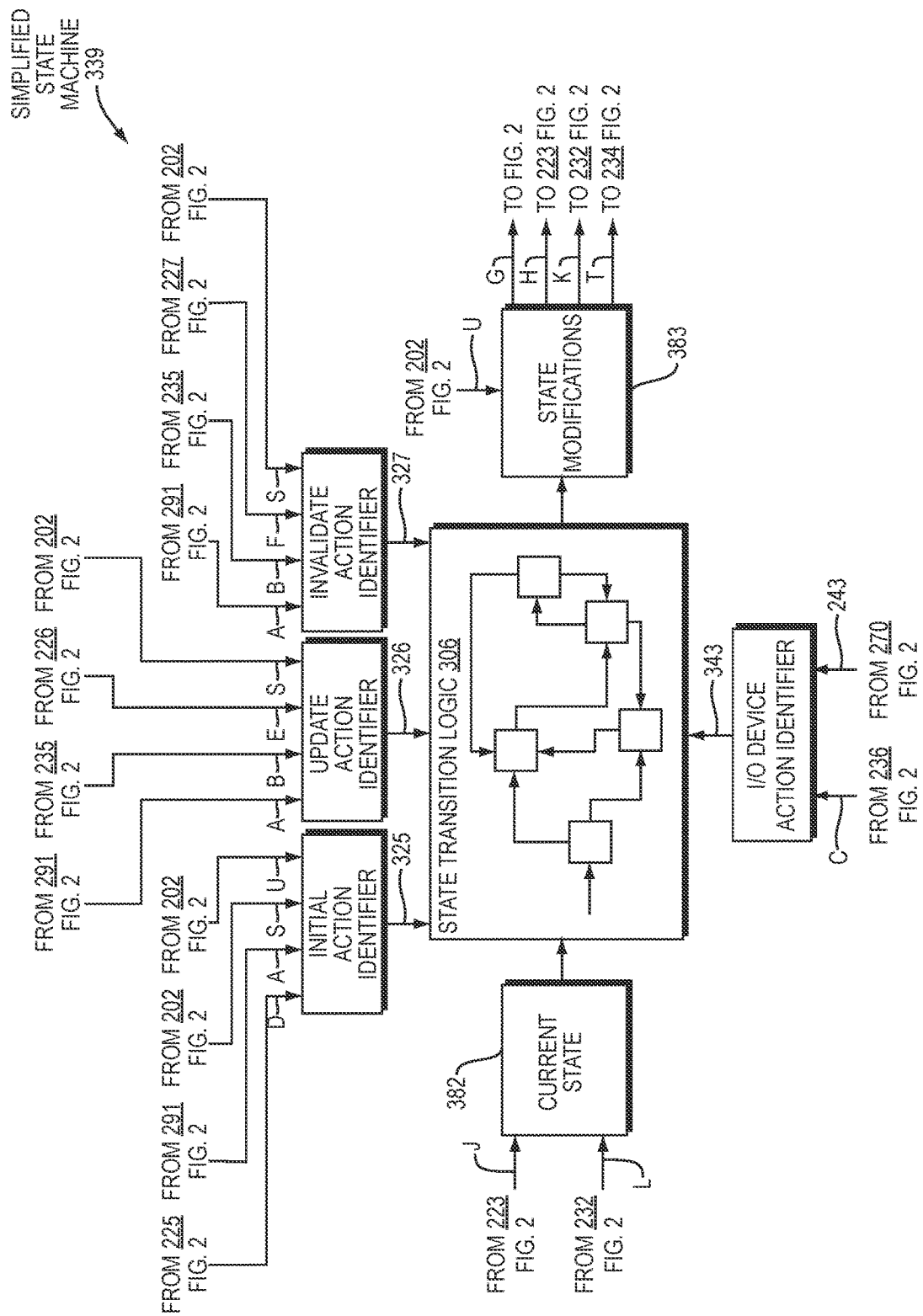
FIG. 3 is a block diagram of an example embodiment of a simplified state machine.

FIG. 3 is a block diagram of an example embodiment of a simplified state machine 339 that may be employed as the simplified state machine 139 and 239 disclosed above with regard to FIG. 1 and FIG. 2, respectively. The main component of the simplified state machine 339 is the state transition logic 306 that is a reduced version of state transition logic of state machine of an I/O device, as disclose above. An exact nature of the state transition logic 306 differs based on the details of the I/O device and its state machine. In general, however, the state transition logic 306 takes a current state 382 and, in response to a stimulus or stimuli, computes a new, updated state 383. The updated state 383 may be either the new state, or a description of the modifications made to the current state 382.

According to the example embodiment, the different possible stimuli are an initial action 325, an update action 326, an invalidate action 327, and an I/O device action 343. The stimulus, or action, may be a simple bit indicating that the stimulus has occurred, or it might contain multiple parameters with different values, e.g., the update action 326 might identify different types of updates, and each type might have a different set of accompanying variables.

The current state 382 includes the predicted state values J, and the predictor entry valid bit L, that is the one or more predicted state values 223 and the predictor entry valid bit 232 of FIG. 2 disclosed above. The state modification output, that is, the updated state 383, may include changes to the predicted future state values G, that is, changes to the one or more predicted future state values 224, changes to the current predicted state values H, that is, changes to the one or more predicted state values 223, and a change to the valid bit K, that is a change to the prediction valid indicator 232. The state modification output, that is, the update state 383, may be gated, i.e., prevented from occurring based on the final physical address of a request U, i.e., the state transition logic 306 determines a potential state transition assuming the virtual address predictor is correct, and if the prediction is incorrect, the modification may be halted or changed, e.g., to invalidate an entry.

According to an example embodiment, stimuli to the simplified state machine 339 may combine multiple inputs to identify a more precise stimulus. For example, an update action 326, invalidate action 327, or I/O device action 343 stimuli may be based on a check for whether the predictor entry matches the requested entry based either on the address B or on the entry specified by the I/O device C. Similarly, such stimuli may be based on a check for whether the predicted or actual PA matches a PA range for the I/O device. Stimuli may also be based on extracted variables from store data, such as the store data S of the load/store pipeline 202 of FIG. 2.

The state modifications 383 produced by the state transition logic 306 of the simplified state machine 339 may include one or more of:

setting a value of one or more state variables $S'_A$, $S'_B$, ..., etc., that is, the one or more predicted state values 223 of FIG. 2, via the output H;

setting a value of one or more future state variables, $FS'_A$, $FS'_B$, ..., etc., that is, the one or more predicted future state values 224, via the output G;

updating one or more state variables $S'_A$, $S'_B$, ..., etc., that is, the one or more predicted state values 223, to the value of a future state variable, that is, $FS'_A$, $FS'_B$, ..., etc., that is, the one or more predicted future state values 224 of FIG. 2, via the output H;

allocating a new predictor entry by setting the predicted entry number 234 via T (i.e., an allocate signal that indicates if the predictor should be allocated, and if so, what the new predictor entry should be) setting the future state variable values, that is, the one or more predicted future state values 224, via the output G, setting the current predicted state variables' values, that is, the one or more predicted state values 223, via H, and marking the predictor entry valid 232 via K; or invalidating the predictor entry via output K.

The different possible state transitions of the state transition logic 306 in the simplified state machine 339 mimic the state transitions that will occur in the I/O device, such as the I/O device 250, for the true state values $S_A$, $S_B$, . . . , etc. that is, the one or more I/O device true state values 257, for the same inputs.

Some state transitions at the I/O device may be split into an initiation action and a completion event in the I/O device. For example, a processor of the I/O device may first perform an action, such as the I/O device initial action 252 disclosed above with regard to FIG. 2, which causes a transition to a temporary, intermediate state (e.g., a pending state), and then, at a later time, an event may occur within the I/O device which causes a transition to a new, non-transient state. In such scenarios, a completion event inside the I/O device may be communicated to the simplified state machine 339 as and identified as the I/O device action 343. This allows the simplified state machine 339 to better match the state transitions of the I/O device, such as the I/O device 250 of FIG. 2.

According to an example embodiment, the simplified state machine 339 benefits from optimization for a common, performance critical case. State transitions that occur rarely in state transition logic of a state machine of an I/O device, that are deemed not critical for performance, or that might require additional inputs or outputs may be omitted from the simplified state machine 339, and instead replaced with a transition that invalidates the predictor entry. In addition, the simplified state machine 339 may be configured to track a subset of the different possible state variables tracked by the I/O device. In contrast, the I/O device needs to implement a complete state machine that tracks all states and state transitions to handle all possible scenarios. The net result is that the simplified state machine 339 can be much smaller, faster, and more power efficient than the complete state machine implementation in the I/O device itself.

Figure 4A:
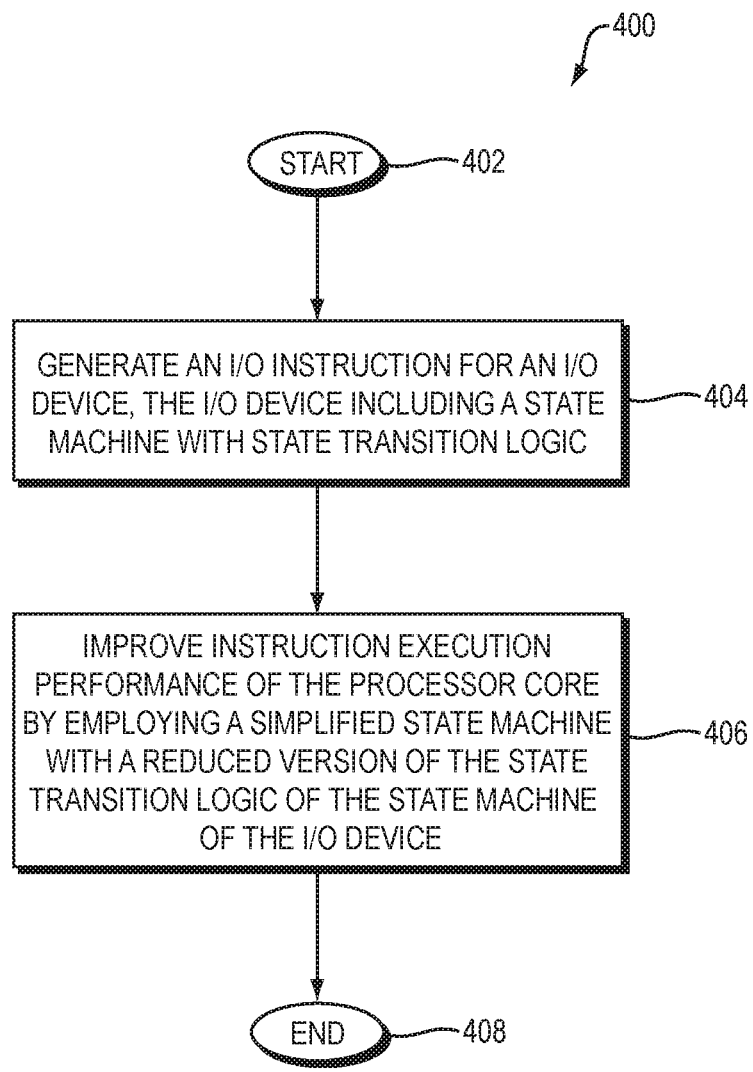
FIG. 4A is a flow diagram of an example embodiment of a method for input/output (I/O) value determination at a processor core.

FIG. 4A is a flow diagram of an example embodiment of a method for input/output (I/O) value determination at a processor core (400). The method begins (402) and generates an I/O instruction for an I/O device, the I/O device including a state machine with state transition logic, the I/O instruction including an address (404). The method improves instruction execution performance of the processor core by employing a simplified state machine with a reduced version of the state transition logic of the state machine of the I/O device to predict at least one state value of at least one respective I/O device true state value to be affected by the I/O instruction at the I/O device, the at least one state value associated with the address (406), and the method thereafter ends (408) in the example embodiment.

Figure 4B:
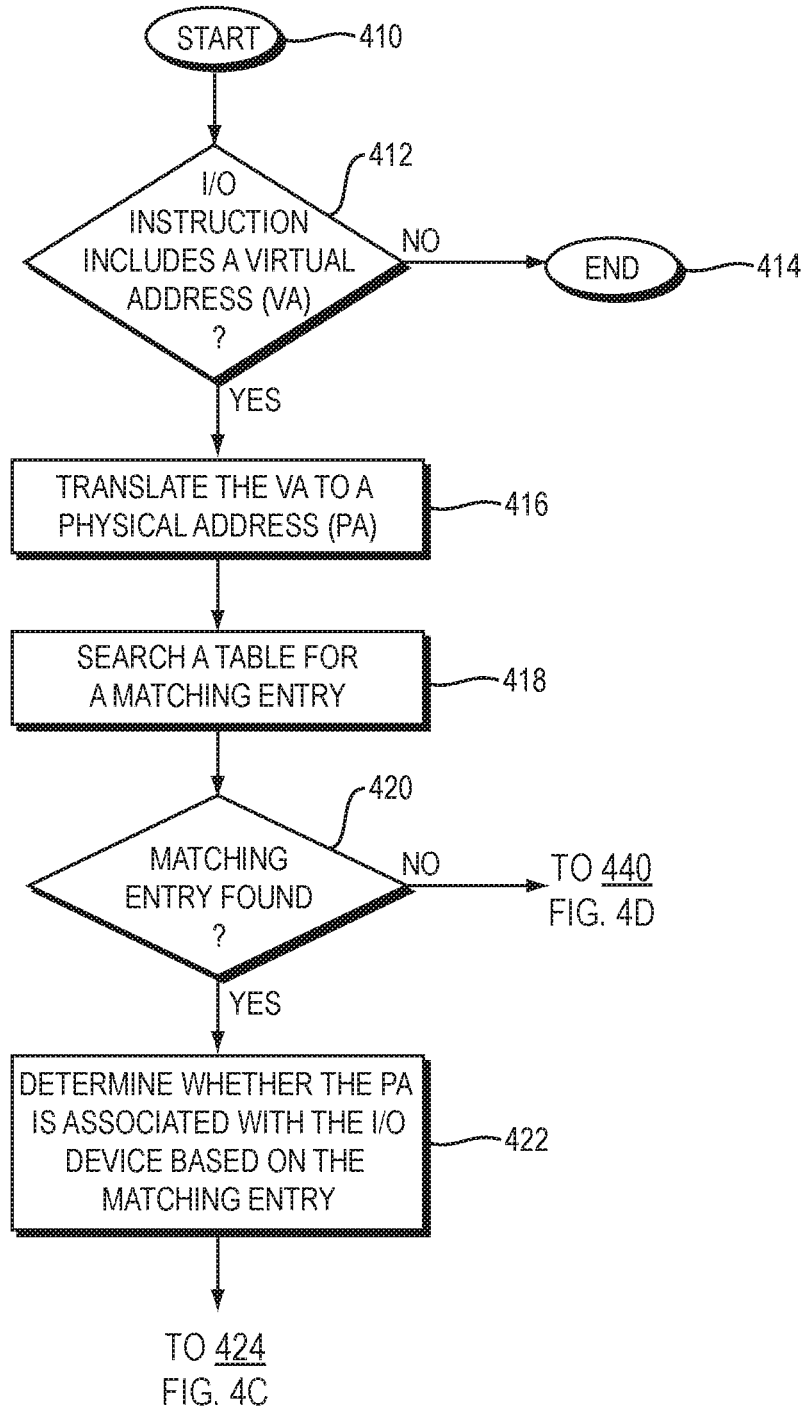
FIGS. 4B-D are flow diagrams of another example embodiment of a method for input/output (I/O) value determination at a processor core.
Figure 4C:
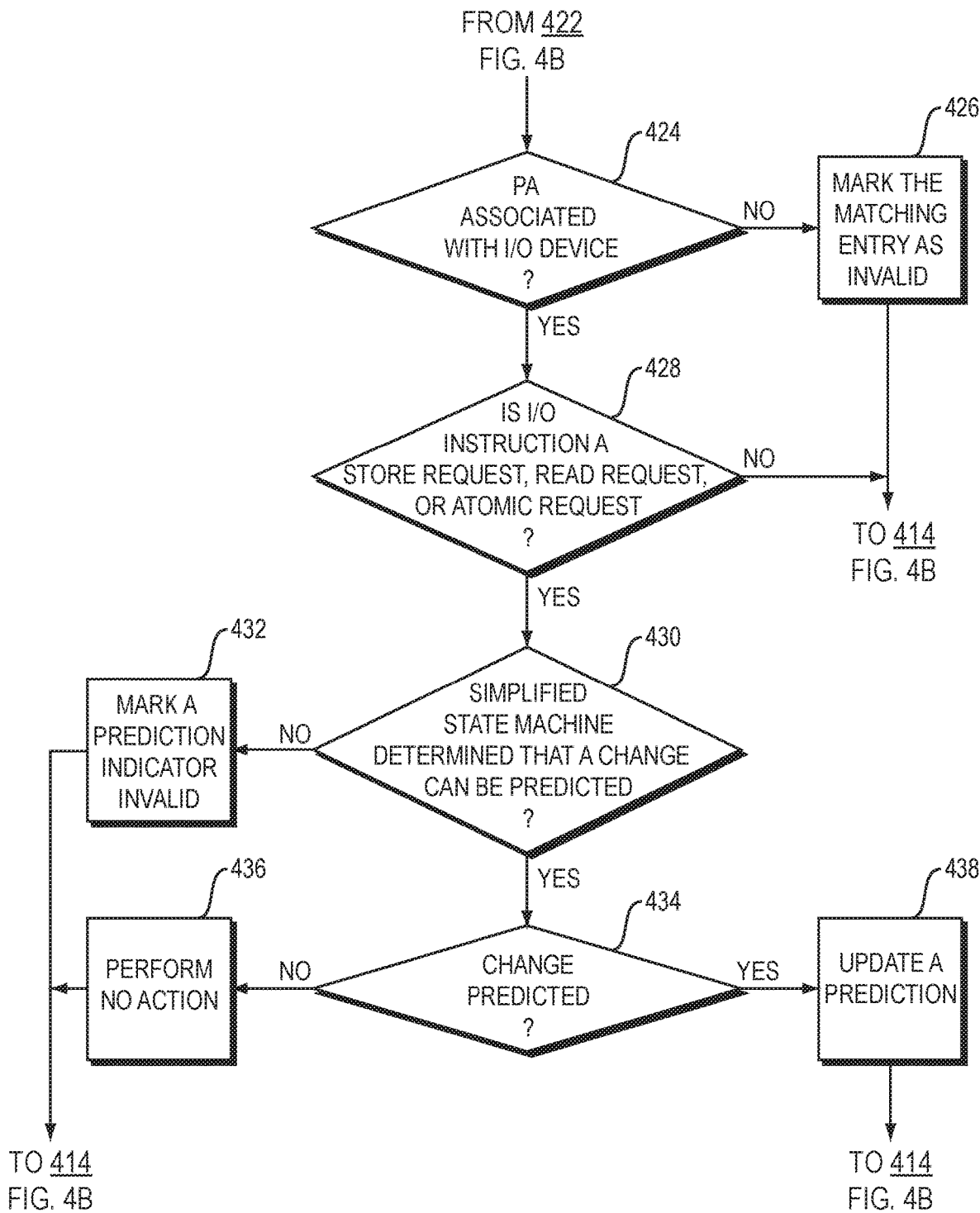
Figure 4D:
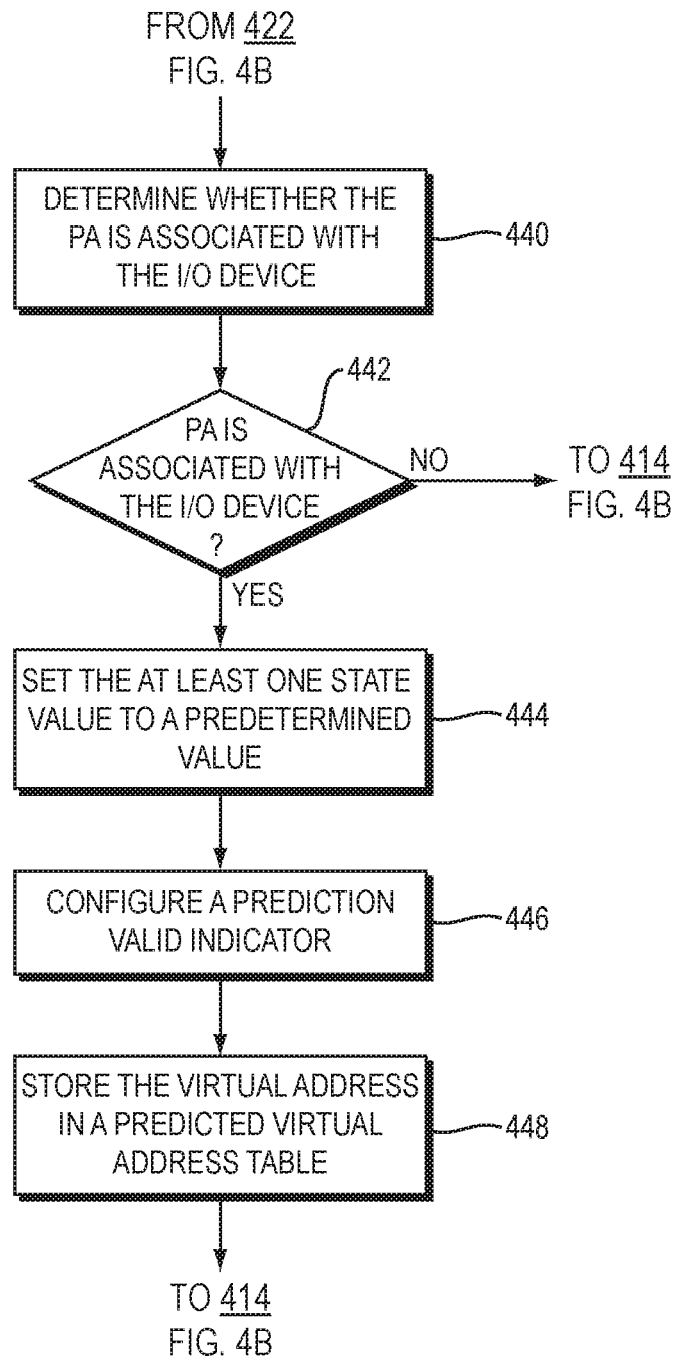

FIGS. 4B-D are flow diagrams of another example embodiment of a method for input/output (I/O) value determination at a processor core. The method begins (410) and checks whether the I/O instruction includes a virtual address (412). In an event the I/O instruction does not include a virtual address, the method thereafter ends (414) in the example embodiment. In an event the I/O instruction does include a virtual address, the method translates the virtual address to a physical address (416). Such translation may be performed, for example, by the load/store pipeline 102 of the processor core 100, disclosed above with regard to FIG. 1. The method searches a table, such as the predicted VA table 290 of FIG. 2, disclosed above, for a matching entry for which the I/O instruction's virtual address matches a predicted virtual address and other fields stored in the matching entry, the other fields specific to address translation in an architecture (418). The method checks for whether a matching entry is found (420). According to an example embodiment, matching of the other fields ensures that the matching entry has been marked as "valid."

If at (420) it is determined that the matching entry is not found, the method determines whether the physical address is associated with the I/O device (440). Performing the physical address match may be performed by decoding at least a portion of physical address bits of the physical address to identify a specific I/O device or decoding the at least a portion of the physical address bits to identify a specific entry within the I/O device. For matching an I/O device, if a predictor, such as the controller 133 or 233 disclosed above with reference to FIG. 1 and FIG. 2, respectively, is only used in conjunction with a single I/O device, then the predictor may simply decode the physical address to see if it maps to the specific I/O device. Alternatively, if the predictor supports multiple different I/O devices, then the predictor entry may store an identifier of the I/O device, and such an identifier may be used for the match determination. According to an example embodiment, the predictor may store an identifier of the specific entry within the I/O device.

If at (442) it is determined that the physical address is not associated with the I/O device, the method thereafter ends (414) in the example embodiment. If, however, is determined that the physical address is associated with the I/O device, the method sets the at least one state value to at least one respective predetermined value (444), configures a prediction valid indicator, such as the predication valid indicator 232 of FIG. 2, disclosed above, to indicate that the at least one state value predicted is valid (446), stores the virtual address in a predicted virtual address table (448), and the method thereafter ends (414) in the example embodiment.

In an event a matching entry is found, the method determines whether the physical address is associated with the I/O device based on the matching entry (422). According to an example embodiment, determines whether the physical address is associated with the I/O device based on the matching entry may include determining whether the physical address is stored in the matching entry. Alternatively, the physical address may be decoded into an I/O device identifier and an entry identifier and these may be matched instead of the entire physical address.

According to the example embodiment, the method checks for whether the physical address was determined to be associated with the I/O device (424). In an event it is determined that the physical address is not associated with the I/O device, the method marks the matching entry as invalid (426) the method thereafter ends (414) in the example embodiment.

In an event it is determined that the physical address is associated with the I/O device, the method checks for whether the I/O instruction is a store request, read request, or atomic request (428). If not, the method thereafter ends (414) in the example embodiment. If yes, the method checks for whether the simplified state machine has determined that a change, to the at least one state value, at least one future state value, or a combination thereof, can be predicted (430). If no, the method marks a prediction indicator invalid (432) and the method thereafter ends (414) in the example embodiment.

In an event (i) it is determined that the matching entry is found at (420), (ii) it is determined that the physical address is associated with the I/O device at (424), (iii) it is determined that the I/O instruction is a store request, read request, or atomic request, at (428) and (iv) the simplified state machine has determined that a change, to the at least one state value, at least one future state value, or a combination thereof, can be predicted at (430), the method checks for whether there is at least one predicted change (434). If not, the method performs no action, that is, no prediction update, and the method thereafter ends (414) in the example embodiment. If at (434) it is determined that there is at least one predicted change, the method updates a prediction of: the at least one state value, the at least one future state value, or a combination thereof (438) and the method thereafter ends (414) in the example embodiment.

Turning back to FIG. 1 and FIG. 2, disclosed above, according to an example embodiment, the I/O device 150 or 250 comprises a packet scheduling module in a network services processor. As known to a person of ordinary skill in the art, a network service processor performs packet processing at layers L2-L7, of the Open Systems Interconnection (OSI) model. As disclosed in e.g., U.S. Pat. No. 7,895,431 B2, incorporated herein by reference, to enable packet processing so that the packets may be forwarded at a wire-speed, the packet processing (work) to be performed on a particular packet includes a plurality of packet processing operations (pieces of work). Each piece of work has an associated tag. The tag allows the work order module to schedule work such that the work can be performed in parallel by a plurality of processor cores while ensuring that execution of the work is ordered and synchronized. When a processor core desires to perform work, the processor core transfers a tag to the work order module through an I/O instruction as disclosed in detail in FIG. 8 and associated text in at least col. 15, line 21-col. 16, line 25 of the U.S. Pat. No. 7,895,431 B2, incorporated herein by reference.

According to an example embodiment, the I/O value predictor, that is, the controller 133 or 233 may be configured to predict a state of a scheduling and ordering block. According to an example embodiment, this may include an I/O read which returns work from a packet order/work (POW) module that may queue and schedule work (packet processing operations) for the processor core 200 as disclosed in at least col. 10, lines 52-62, of the U.S. Pat. No. 7,895,431 B2, incorporated herein by reference.

According to the example embodiment the physical address may correspond to a physical address range corresponding to a scheduler work slot, and the predicted state values, that is the one or more predicted state values 223, may be a subset of the I/O device state, that is, a subset of the one or more true state values 257, that may be state values for one work slot (i.e., an entity to which the scheduler may assign work).

Figure 5:
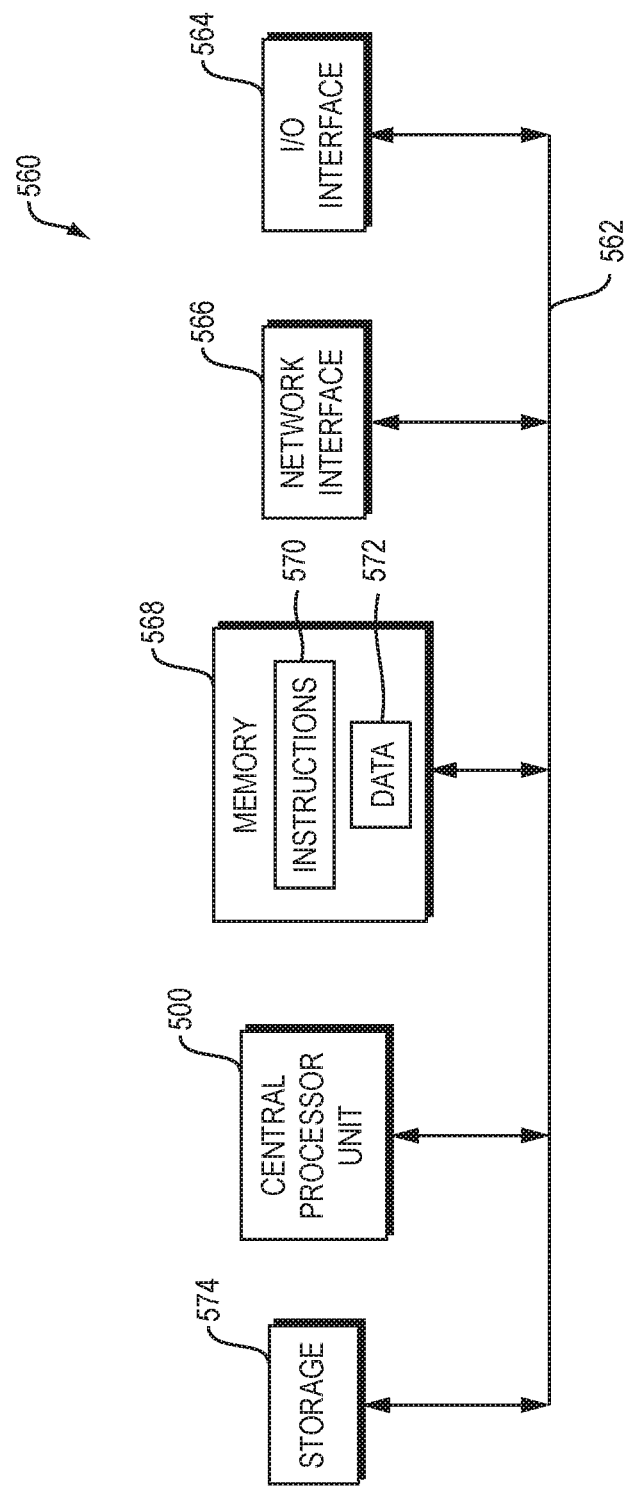
FIG. 5 is a block diagram of an example internal structure of a computer in which various embodiments of the present disclosure may be implemented.

FIG. 5 is a block diagram of an example of the internal structure of a computer 560 in which various embodiments of the present disclosure may be implemented. The computer 560 contains a system bus 562, where a bus is a set of hardware lines used for data transfer among the components of a computer or processing system. The system bus 562 is essentially a shared conduit that connects different elements of a computer system (e.g., processor, disk storage, memory, input/output ports, network ports, etc.) that enables the transfer of information between the elements. Coupled to the system bus 562 is an I/O device interface 564 for connecting various input and output devices (e.g., keyboard, mouse, displays, printers, speakers, etc.) to the computer 560. A network interface 566 allows the computer 560 to connect to various other devices attached to a network. Memory 568 provides volatile storage for computer software instructions 570 and data 572 that may be used to implement embodiments of the present disclosure. Disk storage 574 provides non-volatile storage for computer software instructions 570 and data 572 that may be used to implement embodiments of the present disclosure. A central processor unit 500 is also coupled to the system bus 562 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An apparatus for input/output (I/O) value determination, the apparatus comprising:
   a processor core configured to generate an I/O instruction for an I/O device, the I/O device including a state machine with state transition logic; and
   a controller including a simplified state machine with a reduced version of the state transition logic of the state machine of the I/O device, the controller configured to improve instruction execution performance of the processor core by employing the simplified state machine to predict at least one state value of at least one I/O device true state value to be affected by the I/O instruction at the I/O device.

2. The apparatus of claim 1, wherein the I/O instruction includes a physical address or virtual address, wherein the at least one state value includes multiple state values, and wherein the at least one I/O device true state value includes multiple I/O device true state values.

3. The apparatus of claim 2, wherein the multiple state values are inter-dependent.

4. The apparatus of claim 1, wherein the I/O device includes a scheduler.

5. The apparatus of claim 4, wherein the at least one state value predicted by the simplified state machine represents at least one prediction of a subset of an I/O device state of an entity to which the scheduler assigns work.

6. The apparatus of claim 1, wherein, the processor core includes a load/store pipeline and a multiplexer and wherein, in an event the I/O instruction is a state-read or atomic request including a physical address:
the multiplexer is configured to omit forwarding the state-read or atomic request to the I/O device; and
the controller is configured to determine which one or more of the at least one state value predicted via the simplified state machine should be read in accordance with the state-read or atomic request's physical address and return the one or more of the at least one predicted state values determined to the load/store pipeline.

7. The apparatus of claim 6, wherein the one or more of the at least one predicted state values determined includes multiple values.

8. The apparatus of claim 1, wherein, in an event the I/O instruction includes a virtual address, the processor core is configured to translate the virtual address to a physical address and the controller is configured to:
search a table for a matching entry for which the I/O instruction's virtual address matches a predicted virtual address and other fields stored in the matching entry, the other fields specific to address translation in an architecture; and
in an event the matching entry is found, the controller is further configured to determine whether the physical address is associated with the I/O device based on the matching entry and, in an event it is determined that the physical address is not associated with the I/O device, the controller is further configured to mark the matching entry as invalid.

9. The apparatus of claim 8, wherein, in an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, can be predicted and there is at least one predicted change, the controller is further configured to update a prediction of: the at least one state value, the at least one future state value, or a combination thereof.

10. The apparatus of claim 8, wherein, in an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, cannot be predicted, the controller is further configured to mark a prediction indicator invalid.

11. The apparatus of claim 8, wherein, in an event (i) the matching entry is found, (ii) it is determined that the physical address is associated with the I/O device, (iii) the I/O instruction is a store request, read request, or atomic request, and (iv) the simplified state machine determines that a change can be predicted but no change is to be made to the at least one state value predicted or to the at least one future state value, the controller is configured to perform no action.

12. The apparatus of claim 8, wherein, in an event that the matching entry is not found, the controller is further configured to determine whether the physical address is associated with the I/O device and, in an event that it is determined that the physical address is associated with the I/O device, the controller is further configured to:
set the at least one state value to at least one respective predetermined value;
configure a prediction valid indicator to indicate that the at least one state value predicted is valid; and
store the virtual address in a predicted virtual address table.

13. A method for input/output (I/O) value determination at a processor core, the method comprising:
generating an I/O instruction for an I/O device, the I/O device including a state machine with state transition logic; and
improving instruction execution performance of the processor core by employing a simplified state machine with a reduced version of the state transition logic of the state machine of the I/O device to predict at least one state value of at least one I/O device true state value to be affected by the I/O instruction at the I/O device.

14. The method of claim 13, wherein the I/O instruction includes a physical address or virtual address, wherein the at least one state value includes multiple state values, and wherein the at least one I/O device true state value includes multiple I/O device true state values.

15. The method of claim 14, wherein the multiple state values are inter-dependent.

16. The method of claim 13, wherein the I/O device includes a scheduler and the at least one state value predicted by the simplified state machine represents at least one prediction of a subset of an I/O device state of an entity to which the scheduler assigns work.

17. The method of claim 13, wherein, the processor core includes a load/store pipeline and wherein, in an event the I/O instruction is a state-read or atomic request including a physical address, the method further comprises:
omitting forwarding the state-read or atomic request to the I/O device; and
determining which one or more of the at least one state value predicted via the simplified state machine should be read in accordance with the state-read or atomic request's physical address and returning the one or more of the at least one predicted state values determined to the load/store pipeline.

18. The method of claim 17, wherein the one or more of the at least one predicted state values determined includes multiple values.

19. The method of claim 13, wherein, in an event the I/O instruction includes a virtual address, the method further comprises:
translating the virtual address to a physical address;
searching a table for a matching entry for which the I/O instruction's virtual address matches a predicted virtual address and other fields stored in the matching entry, the other fields specific to address translation in an architecture; and
in an event the matching entry is found, the method further comprises determining whether the physical address is associated with the I/O device based on the matching entry and, in an event it is determined that the physical address is not associated with the I/O device, the method further comprises marking the matching entry as invalid.

20. The method of claim 19, wherein, in an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, can be predicted and there is at least one predicted change, the method further comprises updating a prediction of: the at least one state value, the at least one future state value, or a combination thereof.

21. The method of claim 19, wherein, in an event (i) the matching entry is found, (ii) it is determined that the physical address is associated with the I/O device, (iii) the I/O instruction is a store request, read request, or atomic request, and (iv) the simplified state machine determines that a change, to the at least one state value, at least one future state value, or a combination thereof, cannot be predicted, the method further comprises marking a prediction indicator invalid.

22. The method of claim 19, wherein, in an event (i) the matching entry is found, (ii) it is determined that the physical address is associated with the I/O device, (iii) the I/O instruction is a store request, read request, or atomic request, and (iv) the simplified state machine determines that a change can be predicted but no change is to be made to the at least one state value predicted or to the at least one future state value, the method further comprises perform no action.

23. The method of claim 19, wherein, in an event that the matching entry is not found, the method further comprises determining whether the physical address is associated with the I/O device and, in an event that it is determined that the physical address is associated with the I/O device, the method further comprises:
  setting the at least one state value to at least one respective predetermined value;
  configuring a prediction valid indicator to indicate that the at least one state value predicted is valid; and
  storing the virtual address in a predicted virtual address table.

\* \* \* \* \*

UNITED STATES PATENT AND TRADEMARK OFFICE
CERTIFICATE OF CORRECTION

PATENT NO. : 11,573,800 B2
APPLICATION NO. : 16/209739
DATED : February 7, 2023
INVENTOR(S) : Zebchuk et al.

Page 1 of 1

It is certified that error appears in the above-identified patent and that said Letters Patent is hereby corrected as shown below:

In the Claims

In Column 18, Claim 1, Lines 55-56, after "instruction for an I/O device" insert --and transmit the I/O instruction generated to the I/O device via a communications path--

In Column 18, Claim 1, Lines 60-63, after "the controller configured to" delete "improve instruction execution performance of the processor core by employing the simplified state machine to"

In Column 18, Claim 1, Line 63, after "predict" insert --, using the simplified state machine,--

In Column 18, Claim 1, Line 65, after "instruction at the I/O device" insert --, the processor core further configured to advance instruction execution based on the at least one state value predicted--

In Column 20, Claim 13, Line 20, after "logic;" delete "and" and replace with --transmitting the I/O instruction generated to the I/O device via a communications path;--

In Column 20, Claim 13, Lines 21-24, delete "improving instruction execution performance of the processor core by employing a simplified state machine with a reduced version of the state transition logic of the state machine of the I/O device to predict" and replace with --predicting--

In Column 20, Claim 13, Line 26, after "at the I/O device" insert --, the predicting including employing a simplified state machine with a reduced version of the state transition logic of the state machine of the I/O device; and
advancing instruction execution of the processor core based on the at least one state value predicted--

Signed and Sealed this
Twenty-ninth Day of August, 2023

Katherine Kelly Vidal
*Director of the United States Patent and Trademark Office*